United States Patent

Bell et al.

Patent Number: 5,554,410
Date of Patent: Sep. 10, 1996

[54] DELIVERY OF FRUIT JUICE, ACIDULANTS, AND LABILE COMPONENTS INTO COOKED CANDY BASE

[75] Inventors: Anthony J. Bell, Frelinghuysen Township, N.J.; Daniel J. Streit, Rockford, Ill.

[73] Assignee: Warner-Lambert Company, Morris Plains, N.J.

[21] Appl. No.: 241,219

[22] Filed: May 10, 1994

[51] Int. Cl.$^6$ ............................................. A23G 3/00
[52] U.S. Cl. ............................................................ 426/660
[58] Field of Search .............................................. 426/660

[56] References Cited

U.S. PATENT DOCUMENTS

| | | |
|---|---|---|
| 4,497,846 | 2/1985 | Boursier et al. . |
| 4,753,816 | 6/1988 | Vink et al. . |
| 5,167,981 | 12/1992 | Mergelsberg et al. . |

FOREIGN PATENT DOCUMENTS

| | | |
|---|---|---|
| 0094292 | 11/1983 | European Pat. Off. . |
| 0343748 | 11/1989 | European Pat. Off. . |
| 0348696 | 1/1990 | European Pat. Off. . |
| 3420026 | 12/1985 | Germany . |
| 6508686 | 1/1966 | Netherlands . |
| 863181 | 3/1961 | United Kingdom . |
| 1049228 | 11/1966 | United Kingdom . |

OTHER PUBLICATIONS

Barnett The Art & Science of Candy Manufacturing, (1978) pp. 16–18; 47–51; 53–55 58; 61; 132.
Ph. Bryselbout "Guide", 1984, SEPAIC, Paris, pp. 333–336.
B. Minifie, "Chocolate", AVI Publishing, Connecticut, 1980, pp. 706–713.

*Primary Examiner*—Donald E. Czaja
*Assistant Examiner*—Choon P. Koh
*Attorney, Agent, or Firm*—Linda A. Vag

[57] ABSTRACT

The present invention pertains to a method for preparing a hard candy containing from about 1% to about 35% fruit juice, by weight, which comprises the steps of (a) providing a vacuum cooker having a cooker coil, an atmospheric chamber, and a vacuum chamber; (b) forming a sugar syrup having a moisture content from about 0.1% to about 5%, by weight; (c) heating the sugar syrup in the cooker coil to cook the syrup; (d) passing the cooked sugar syrup from the cooker coil to the atmospheric chamber; (e) admixing fruit juice with the cooked sugar syrup in the atmospheric chamber to form a fruit juice-sugar syrup mixture; (f) passing the fruit juice-sugar syrup mixture from the atmospheric chamber to the vacuum chamber to remove excess water; and (g) removing the fruit juice-sugar syrup mixture from the vacuum chamber and forming the fruit juice-sugar mixture into desired shapes of hard candy. This invention also pertains to hard candy containing fruit juice prepared by the inventive method. This invention further pertains to an improved method for making hard candy containing an acidulant or a thermolabile component.

6 Claims, 1 Drawing Sheet

DELIVERY OF FRUIT JUICE, ACIDULANTS, AND LABILE COMPONENTS INTO COOKED CANDY BASE

BACKGROUND OF THE INVENTION

1. Field of the Invention

This invention pertains to an improved method for making hard candy containing fruit juice. The hard candy is prepared by admixing fruit juice with a cooked sugar syrup in the atmospheric chamber of a vacuum cooker to minimize contact time between the fruit juice and sugar syrup. Excess water is removed from the syrup mixture in the vacuum chamber and the syrup mixture is then cooled and formed into the desired shapes of hard candy.

This invention also pertains to an improved method for making hard candy containing an acidulant or a thermolabile component. The hard candy is prepared by admixing the acidulant or thermolabile component with a cooked sugar syrup in the atmospheric chamber of a vacuum cooker to minimize contact time between the acidulant and the sugar syrup, or the thermolabile component and the hot sugar syrup and cooker coil. This invention also pertains to hard candies prepared by the inventive methodsS.

2. Description of the Background

The preparation of confectionery formulations is historically well known and has changed little through the years. Confectionery items have been classified as either "hard" confectionery or "soft" confectionery. In general, a hard confectionery has a candy base composed of a mixture of sugar and other carbohydrate bulking agents kept in an amorphous or glassy condition. This candy base is considered a solid syrup of sugars generally containing up to about 92% corn syrup, up to about 55% sugar, and from about 0.1% to about 5% water, by weight. The syrup component is generally prepared from corn syrups high in fructose but may include other materials. Further ingredients such as flavoring agents, sweetening agents, acidifying agents and coloring agents may also be added. Confectionery formulations are routinely prepared by conventional methods such as those involving fire cookers, vacuum cookers, and scraped-surface cookers, also referred to as high speed atmospheric cookers.

A problem in the field of confectionery formulations is that there is no satisfactory method for preparing a hard candy made with relatively large amounts of fruit juice or other acidulants. Fruit juices are acidic and tend to cause inversion of the sugar syrup during the cooking process. When fruit juice is added to a sugar syrup after the cooking process, the resulting candy tends to be too moist. Similarly, there is no satisfactory method for preparing a hard candy made with relatively large amounts of a thermolabile component. Thermolabile components tend to burn on the hot surface of the cooker coil in a non-scrape surface cooker resulting in a plugged cooker.

U.S. Pat. No. 4,753,816, issued to Vink et al., discloses the preparation of a shelf stable hard candy glass containing natural fruit juice and fruit juice solids and having, on a dry weight basis, a moisture content of about 0.1% to 5%, a fruit solids contents of about 5% to 25%, and an added sugar component content of about 70.0% to 94.9%. Vink et al. buffers the sugar syrup to a pH of about 4 to 8, prior to cooking, to prevent inversion of the sugar by the fruit juice.

Thus, none of the known procedures for preparing hard candy containing fruit juice, acidulants, or thermolabile components is entirely satisfactory. Buffering the sugar syrup prior to cooking to prevent inversion of the sugar by the fruit juice or acidulant tends to alter the flavor of the fruit juice. Moreover, such methods may not be effective for use with very acidic juices or strong acidulants. The present invention provides an improved method for preparing hard candy containing fruit juice, acidulants, or thermolabile components.

SUMMARY OF THE INVENTION

In one embodiment, the present invention pertains to a method for preparing a hard candy containing from about 1% to about 35% fruit juice, by weight, which comprises the steps of:

(a) providing a vacuum cooker having a cooker coil, an atmospheric chamber, and a vacuum chamber;

(b) forming a sugar syrup having a moisture content from about 0.1% to about 5%, by weight;

(c) heating the sugar syrup in the cooker coil to cook the syrup;

(d) passing the cooked sugar syrup from the cooker coil to the atmospheric chamber;

(e) admixing fruit juice with the cooked sugar syrup in the atmospheric chamber to form a fruit juice-sugar syrup mixture;

(f) passing the fruit juice-sugar syrup mixture from the atmospheric chamber to the vacuum chamber to remove excess water; and (g) removing the fruit juice-sugar syrup mixture from the vacuum chamber and forming the fruit juice-sugar mixture into desired shapes of hard candy.

In another embodiment, the present invention pertains to a method for preparing a hard candy containing from about 0.1% to about 10% of an acidulant, by weight, which comprises the steps of:

(a) providing a vacuum cooker having a cooker coil, an atmospheric chamber, and a vacuum chamber;

(b) forming a sugar syrup having a moisture content from about 0.1% to about 5%, by weight;

(c) heating the sugar syrup in the cooker coil to cook the syrup;

(d) passing the cooked sugar syrup from the cooker coil to the atmospheric chamber;

(e) admixing the acidulant with the cooked sugar syrup in the atmospheric chamber to form an acidulant-sugar syrup mixture;

(f) passing the acidulant-sugar syrup mixture from the atmospheric chamber to the vacuum chamber to remove excess water; and (g) removing the acidulant-sugar syrup mixture from the vacuum chamber and forming the acidulant-sugar mixture into desired shapes of hard candy.

In yet another embodiment, the present invention pertains to a method for preparing a hard candy containing from about 0.1% to about 5% of a thermolabile component, by weight, which comprises the steps of:

(a) providing a vacuum cooker having a cooker coil, an atmospheric chamber, and a vacuum chamber;

(b) forming a sugar syrup having a moisture content from about 0.1% to about 5%, by weight;

(c) heating the sugar syrup in the cooker coil to cook the syrup;

(d) passing the cooked sugar syrup from the cooker coil to the atmospheric chamber;

(e) admixing the thermolabile component with the cooked sugar syrup in the atmospheric chamber to form a thermolabile component-sugar syrup mixture;

(f) passing the thermolabile component-sugar syrup mixture from the atmospheric chamber to the vacuum chamber to remove excess water; and (g) removing the thermolabile component-sugar syrup mixture from the vacuum chamber and forming the thermolabile component-sugar mixture into desired shapes of hard candy.

This invention also pertains to hard candies prepared by the inventive methods.

DETAILED DESCRIPTION OF THE INVENTION

Figure 1:
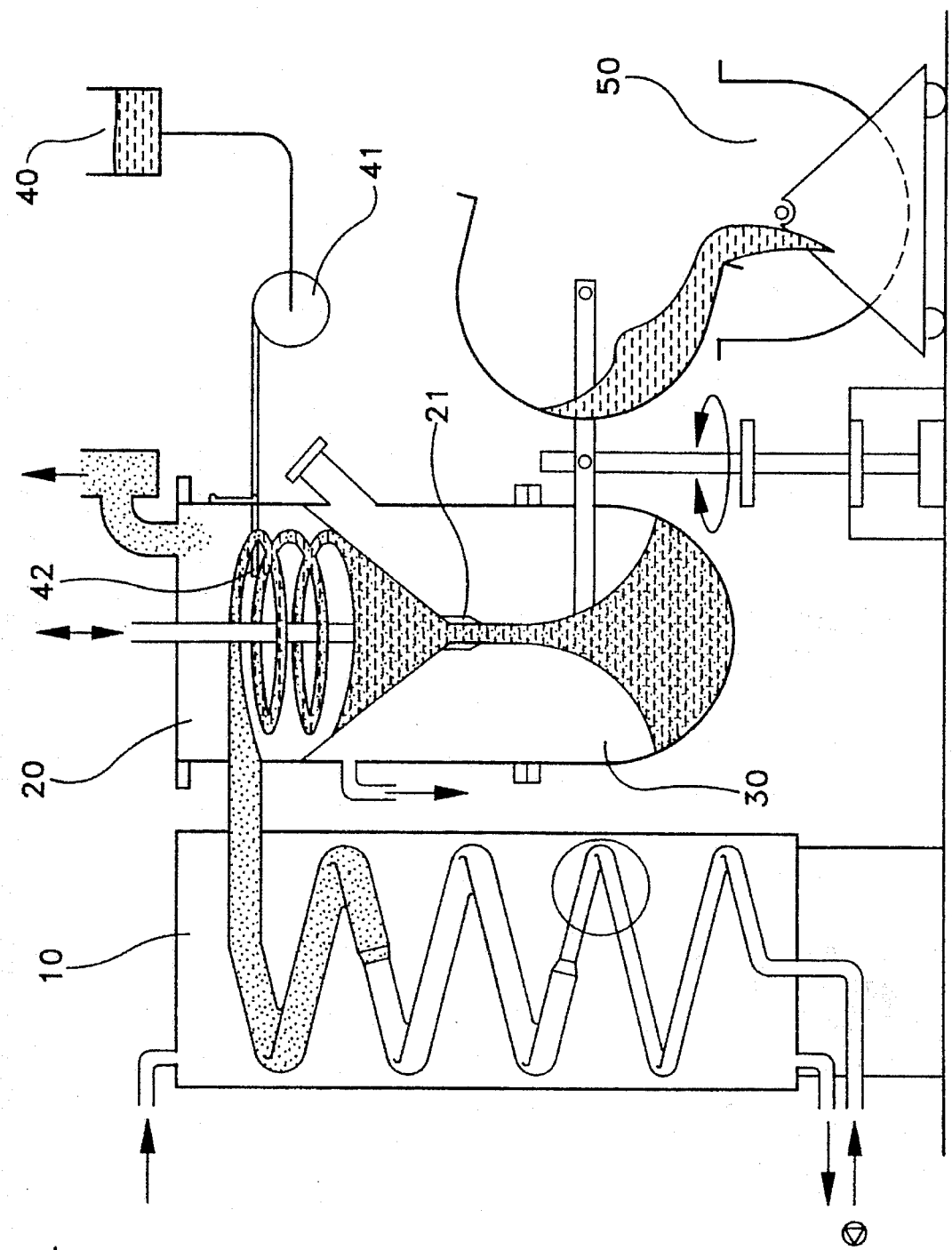
FIG. 1 is an illustration of a vacuum cooker having a cooker coil, an atmospheric chamber, and a vacuum chamber for preparing hard candy containing fruit juice, acidulants, or thermolabile components according to the method of the present invention.

In one embodiment, the present invention pertains to a method for incorporating fruit juice into hard candy in a vacuum cooker having a cooker coil, an atmospheric chamber, and a vacuum chamber. The method comprises forming a sugar syrup having a moisture content from about 0.1% to about 5%, by weight; heating the sugar syrup in the cooker coil of the vacuum cooker to cook the syrup; passing the cooked sugar syrup from the cooker coil to the atmospheric chamber; admixing fruit juice with the cooked sugar syrup in the atmospheric chamber to form a fruit juice-sugar syrup mixture; passing the fruit juice-sugar syrup mixture from the atmospheric chamber to the vacuum chamber to remove excess water; and removing the fruit juice-sugar syrup mixture from the vacuum chamber and forming the fruit juice-sugar mixture into desired shapes of hard candy. The vacuum cooker may be any cooker having an atmospheric chamber and a vacuum chamber and may also be a thin film rise cooker.

In another embodiment, the present invention pertains to a method for incorporating an acidulant into hard candy by admixing the acidulant with the cooked sugar syrup in the atmospheric chamber of a vacuum cooker according to the method of the present invention. In yet another embodiment, the present invention pertains to a method for incorporating a thermolabile component into hard candy by admixing the thermolabile component with the cooked sugar syrup in the atmospheric chamber of a vacuum cooker according to the method of the present invention.

Applicants have discovered that by injecting fruit juice or an acidulant into a sugar syrup candy base, after the candy base is cooked, but before excess water is removed from the candy base, an improved hard candy can be prepared. Prior art methods for adding fruit juice or an acidulant to a candy base before cooking generally cause inversion of the sugar in the candy base. Adding fruit juice to a candy base after the cooking and water removal step generally results in a candy base containing too much moisture. Buffering the sugar syrup to prevent inversion of the sugar by the fruit juice or an acidulant tends to alter the flavor of the juice. Applicants have found that by injecting fruit juice or an acidulant into a candy base after cooking but before the water removal step, one can minimize contact time between the fruit juice and sugar syrup and prevent inversion of the sugar. Similarly, by injecting a thermolabile component into a candy base after cooking but before the water removal step, one can minimize contact time between the thermolabile component and the hot sugar syrup and cooker coil and prevent degradation of the thermolabile component.

The term "hard candy", as used herein, means a hard, sugar glass, amorphous candy product having a candy base composed of a mixture of sugar and other carbohydrate bulking agents. The candy is prepared by evaporating water from a sugar solution to concentrate to a solids content of not less than about 95%, by weight. The candy base is a solid syrup of sugars normally containing up to about 92% corn syrup, up to about 55% sugar, and from about 0.1% to about 5% water, preferably from about 0.1% to about 4%, and more preferably from about 0.5% to about 4%, by weight of the final composition.

The sugar component of the candy base may be any water-soluble bulking agent material normally used in the manufacture of confectionery products such as those selected from the group consisting of, but not limited to, monosaccharides, disaccharides, polysaccharides, sugar alcohols, and mixtures thereof; randomly bonded glucose polymers such as those polymers distributed under the tradename Polydextrose by Pfizer, Inc., Groton, Conn.; isomalt (a racemic mixture of alpha-D-glucopyranosyl-1,6-mannitol and alpha-D-glucopyranosyl-1,6-sorbitol manufactured under the tradename Palatinit by Suddeutsche Zucker), maltodextrins; hydrogenated starch hydrolysates; hydrogenated hexoses; hydrogenated disaccharides; minerals, such as calcium carbonate, talc, titanium dioxide, dicalcium phosphate, celluloses and the like, and mixtures thereof.

Suitable sugar bulking agents include monosaccharides, disaccharides and polysaccharides such as xylose, ribulose, glucose (dextrose), mannose, galactose, fructose (levulose), sucrose (sugar), maltose, invert sugar, partially hydrolyzed starch and corn syrup solids, and mixtures thereof. Mixtures of sucrose and corn syrup solids are the preferred sugar bulking agents.

Suitable sugar alcohol bulking agents include sorbitol, xylitol, mannitol, galactitol, maltitol, and mixtures thereof. Mixtures of sorbitol and mannitol are the preferred sugar alcohol bulking agents.

Maltitol is a sweet, non-caloric, water-soluble sugar alcohol useful as a bulking agent in the preparation of non-caloric beverages and foodstuffs and is more fully described in U.S. Pat. No. 3,708,396, which disclosure is incorporated herein by reference. Maltitol is made by hydrogenation of maltose which is the most common reducing disaccharide and is found in starch and other natural products.

The term "fruit juice", as used herein, means the juice of fleshy fruits which are the ripened ovaries of flowers. These fruits include the fruit of deciduous trees such as apple, apricot, cherry, peach, pear, plum, nectarine, and persimmon; citrus fruits such as orange, lemon, lime, grapefruit, tangerine, pummelo, citron, papeda, tachibana, and kumquat; bushberry fruits such as blackberry, raspberry, dewberry, strawberry, blueberry, bilberry, cranberry, huckleberry, elderberry, currant, and gooseberry; berry fruits such at tomato, grape, banana (including plantain), and avocado; multiple fruits such as pineapple, mulberry, fig, and breadfruit; and gourd fruits such as watermelon, muskmelon, canteloupe, cucumber, squash, pumpkin, and citron. Preferably, the fruit juice is selected from the group consisting of raspberry, strawberry, grape, grapefruit, cherry, orange, apple, banana, pineapple, pear, and cranberry juice, and mixtures thereof. More preferably, the fruit juice is selected from the group consisting of raspberry, strawberry, grape, grapefruit, cherry, orange, and cranberry juice, and most preferably, the fruit juice is cranberry juice.

The hard candy products of the present invention in final form have a fruit juice content from about 1% to about 35%, preferably from about 9% to about 31%, and more preferably from about 15% to about 29%, by weight.

The term "fruit juice solids", as used herein means the fiber, pulp, sugar, or other plant matter which is normally present in pureed fruit or fruit juice prepared for human consumption. The fruit juice used in preparing the products of the present invention is preferably used in the form of an unclarified fruit juice concentrate which contains the juice of one or more fruits and has a fruit juice solids content from about 15% to about 80%, preferably from about 50% to about 75%, and more preferably from about 58% to about 68%, by weight (Brix). When the fruit juice has a solids content of less than about 15%, by weight, the fruit juice can be concentrated and the solids content of the juice increased by removing some of the water content of the juice by commonly employed techniques for forming fruit juice concentrates or by adding a high fruit solids content material thereto, such as a pureed fruit. When the naturally occurring fruit has a relatively high solids content, such as in the case of banana, fig, canteloupe, avocado, breadfruit, pumpkin, and the like, the fruit may be pureed and then diluted with water or a low solids content juice of another fruit may be added to provide a fruit juice concentrate having the desired solids content for the purposes of the present invention.

The term "acidulant", as use herein refers to a wide variety of acids, mostly organic, used in food processing as flavor intensifiers, preservatives, buffers, meat-curing agents, viscosity modifiers, etc. In general, any acidulant used in food processing which will cause inversion of the sugar in a candy base during cooking is within the scope of the present invention. The acidulants most commonly used may be selected from the group consisting of ascorbic acid, citric acid, tannic acid, lactic acid, fumaric acid, acetic acid, propionic acid, sorbic acid, succinic acid, and phosphoric acids. Preferred acidulants may be selected from the group consisting of ascorbic acid, citric acid, tannic acid, and lactic acid.

The hard candy products of the present invention in final form have an acidulant content from about 0.1% to about 10%, preferably from about 1% to about 8%, and more preferably from about 2% to about 5%, by weight.

The term "thermolabile component", as use herein refers to a wide variety of thermally unstable components, mostly organic, such as plant gum carageens, used in food processing as stabilizing agents, viscosity modifiers, etc. In general, any thermolabile component used in food processing which will degrade during cooking of the sugar in a candy base is within the scope of the present invention. The thermolabile components most commonly used may be selected from the group consisting of pectin, alginates, guar gum, dextrans, and gelatins. Preferred thermolabile components are selected from the group consisting of pectin, alginates, and gelatins.

Pectin is a polysaccharide substance, present in the cell walls of all plant tissues, which functions as an intercellular cementing material. Pectin has a molecular weight from about 20,000 to about 400,000 and occurs naturally as the partial methyl ester of $\alpha$-(1-4) linked D-polygalacturonate sequences interrupted with (1->2)-L-rhamnose residues. Neutral sugars (D-galactose, L-arabinose, D-xylose, and L-fucose) form side chains on the pectin molecule. Pectin is practically odorless, has a mucilaginous taste, is stable under mild acidic conditions, and depolymerizes under strong acidic or basic conditions.

Alginic Acid (polymannuronic acid) is a hydrophilic, colloidal polysaccharide obtained from seaweeds which in the form of mixed salts of calcium, magnesium, and other bases occurs as a structural component of the cell wall. Alginic acid has a molecular weight of about 240,000 and is a linear polymer of $\beta$-(1-> 4)-D-mannosyluronic acid and $\alpha$-(1-> 4)-L-gulosyluronic acid residues, the relative proportions of which vary with the botanical source and state of maturation of the plant. Alginic acid is very slightly soluble in water, tasteless, and is capable of absorbing 200–300 times its weight of water. Calcium salt, Sorbsan; Potassium salt, Stercofuge; Sodium salt, Algin.

Guar Gum (Guar flour) is the ground endosperms of *Cyamopsis tetragonolobus* (L.) Taub., Leguminosae which is cultivated in India as livestock feed. Guar Gum has a molecular weight of about 220,000. The water soluble fraction (85%) of guar flour is called guaran which consists of linear chains of (1->4)-$\beta$-D-mannopyranosyl units with $\alpha$-D-galactopyranosyl units attached by (1->6) linkages. The ratio of D-galactose to D-mannose is 1:2. Guar gum is used as a protective colloid, stabilizer, thickener, and film forming agent for cheese, salad dressings, ice cream, and soups.

Dextran is a term applied to polysaccharides produced by bacteria growing on a sucrose substrate containing a backbone of D-glucose units linked predominantly $\alpha$-D(1->6). The chemical and physical properties of the dextrans vary with the methods of production. Native dextrans usually have high molecular weight. Lower molecular weight clinical dextrans are usually prepared by depolymerization of native alextrans or by synthesis. All dextrans are composed exclusively of $\alpha$-D-glucopyranosyl units, differing only in degree of branching and chain length.

Gelatin is a heterogeneous mixture of water-soluble proteins of high average molecular weight derived from collagen by hydrolysis. The approximate amino acid content of gelatin is: glycine 25.5%, alanine 8.7%, valine 2.5%, leucine 3.2%, isoleucine 1.4%, cystine and cysteine 0.1%, methionine 1.0%, phenylalanine 2.2%, proline 18.0%, hydroxyproline 14.1%, serine 0.4%, threonine 1.9%, tyrosine 0.5%, aspartic acid 6.6%, glutamic acid 11.4%, arginine 8.1%, lysine 4.1%, and histidine 0.8%. The total is over 100% because water is incorporated into the molecules of the individual amino acids. Nutritionally, gelatin is an incomplete protein lacking tryptophan and containing but small amounts of other important amino acids. Gelatin exists as a colorless, practically odorless, tasteless sheets, flakes, or coarse powder which absorb 5–10 times its weight of water to form a gel. Gelatin is used as a stabilizer, thickener and texturizer in food.

The hard candy products of the present invention in final form have a thermolabile component content from about 0.1% to about 5%, preferably from about 0.2% to about 3%, and more preferably from about 0.3% to about 1.5%, by weight.

In a preferred embodiment, the hard candy products of the present invention, comprising an acidulant and/or a thermolabile component, further comprise from about 1% to about 35% fruit juice, by weight.

A variety of traditional ingredients may be optionally included in the hard candy in effective amounts such as coloring agents, antioxidants, preservatives, flavoring agents, and the like. For example, titanium dioxide and other dyes suitable for food, drug and cosmetic applications, known as F. D. & C. dyes, may be utilized. An anti-oxidant such as butylated hydroxytoluene (BHT), butylated hydroxyanisole (BHA), propyl gallate, and mixtures thereof, may also be included. Other conventional confectionery additives known to one having ordinary skill in the art may also be used in the candy.

The flavoring agents which may be used include those flavors known to the skilled artisan, such as natural and/or artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, artificial vanilla, cinnamon derivatives, and various fruit flavors, whether employed individually or in admixture.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in *Chemicals Used in Food Processing,* publication 1274, pages 63–258, by the National Academy of Sciences, may be used.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, mixtures thereof and the like.

The flavoring agents of the present invention may be used in many distinct physical forms well known in the art to provide an initial burst of flavor and/or a prolonged sensation of flavor. Without being limited thereto, such physical forms include free forms, such as spray dried, powdered, and beaded forms, and encapsulated forms, and mixtures thereof.

The amount of flavoring agent employed herein is normally a matter of preference subject to such factors as the type of final candy composition, the individual flavor, the fruit juice (acidulant or thermolabile component) employed, and the strength of flavor desired. Thus, the amount of flavoring may be varied in order to obtain the result desired in the final product and such variations are within the capabilities of those skilled in the art without the need for undue experimentation. In candies, the flavoring agent is generally present in amounts from about 0.02% to about 5%, and preferably from about 0.1% to about 2%, and more preferably, from about 0.8% to about 1.8%, by weight.

The coloring agents useful in the present invention are used in amounts effective to produce the desired color. These coloring agents include pigments which may be incorporated in amounts up to about 6%, by weight. A preferred pigment, titanium dioxide, may be incorporated in amounts up to about 2%, and preferably less than about 1%, by weight. The coloring agents may also include natural food colors and dyes suitable for food, drug and cosmetic applications. These coloring agents are known as F.D.& C. dyes and lakes. The materials acceptable for the foregoing uses are preferably water-soluble. Illustrative nonlimiting examples include the indigoid dye known as F.D.& C. Blue No.2, which is the disodium salt of 5,5-indigotindisulfonic acid. Similarly, the dye known as F.D.& C. Green No. 1 comprises a triphenylmethane dye and is the monosodium salt of 4-[4-(N-ethyl-p-sulfoniumbenzylamino) diphenylmethylene]-[ 1-(N-ethyl-N-p-sulfoniumbenzyl)-delta- 2,5-cyclohexadieneimine]. A full recitation of all F.D.& C. coloring agents and their corresponding chemical structures may be found in the Kirk-Othmer Encyclopedia of Chemical Technology, 3rd Edition, in volume 5 at pages 857–884, which text is incorporated herein by reference.

Hard confectionery may be routinely prepared by conventional methods such as those involving fire cookers, vacuum cookers, and scraped-surface cookers, also referred to as high speed atmospheric cookers. Preferably, the hard confectionery may is prepared in a vacuum cooker.

Fire cookers involve the traditional method of making a candy base. In this method, the desired quantity of carbohydrate bulking agent is dissolved in water by heating the agent in a kettle until the bulking agent dissolves. Additional bulking agent may then be added and cooking continued until a final temperature of 145° C. to 156° C. is achieved. The batch is then cooled and worked as a plastic-like mass to incorporate additives such as flavors, coloring agents, and the like.

A high-speed atmospheric cooker uses a heat-exchanger surface which involves spreading a film of candy on a heat exchange surface, the candy is heated to 165° C. to 170° C. in a few minutes. The candy is then rapidly cooled to 100° C. to 120° C. and worked as a plastic-like mass enabling incorporation of the additives, such as flavors, coloring agents, and the like.

In a vacuum cooker, the carbohydrate bulking agent is boiled to a temperature from about 130° C. to about 160° C., vacuum is applied, and additional water is boiled off without extra heating. When cooking is complete, the mass is a semi-solid and has a plastic-like consistency. At this point, flavors, coloring agents, and other additives are admixed in the mass by routine mechanical mixing operations.

The optimum mixing required to uniformly mix the flavors, coloring agents, and other additives during conventional manufacturing of hard confectionery is determined by the time needed to obtain a uniform distribution of the materials. Normally, mixing times of from 4 to 10 minutes have been found to be acceptable.

In accord with the present invention, the candy base is cooked at a temperature from about 130° C. to about 160° C. at atmospheric pressure, preferably in the cooker coil of a vacuum cooker. After the candy base is cooked, the candy base is passed from the cooker coil to the atmospheric chamber of the vacuum cooker. In the atmospheric chamber, fruit juice (acidulant or thermolabile component) is mixed with the cooked sugar syrup to form a fruit juice (acidulant or thermolabile component) -sugar syrup mixture. The fruit juice-sugar syrup mixture may comprise from about 75% to about 95%, and preferably from about 82% to about 92% of the sugar component, and from about 5% to about 25%, and preferably from about 8% to about 18%, of fruit juice solids, by weight. The fruit juice (acidulant or thermolabile component) -sugar syrup mixture is then passed from the atmospheric chamber to the vacuum chamber to cool the candy base and remove excess water. The pressure in the vacuum chamber may be in the range from about 76 mm to 760 mm of Hg. On a batch basis, the cooling time in the vacuum chamber may take from about 5 minutes to about 60 minutes depending on the temperature employed, the size of the batch, and the amount of water to be removed.

Once the candy mass has been properly tempered, it may be cut into workable portions or formed into desired shapes. A variety of forming techniques may be utilized depending upon the shape and size of the final product desired. A general discussion of the composition and preparation of hard confections may be found in H. A. Lieberman, *Pharmaceutical Dosage Forms: Tablets,* Volume 1 (1980), Marcel Dekker, Inc., New York, N.Y. at pages 339 to 469, which disclosure is incorporated herein by reference.

The apparatus useful in accordance with the present invention comprises cooking and mixing apparatus well known in the confectionery manufacturing arts, and therefore the selection of the specific apparatus will be apparent to the artisan.

In a preferred embodiment, the present invention is directed to a hard candy containing from about 1% to about 35% fruit juice, by weight, prepared by a method which comprises the steps of:

(a) providing a vacuum cooker having a cooker coil, an atmospheric chamber, and a vacuum chamber;

(b) forming a sugar syrup having a moisture content from about 0.1% to about 5%, by weight;

(c) heating the sugar syrup in the cooker coil to cook the syrup;

(d) passing the cooked sugar syrup from the cooker coil to the atmospheric chamber;

(e) admixing fruit juice with the cooked sugar syrup in the atmospheric chamber to form a fruit juice-sugar syrup mixture;

(f) passing the fruit juice-sugar syrup mixture from the atmospheric chamber to the vacuum chamber to remove excess water; and (g) removing the fruit juice-sugar syrup mixture from the vacuum chamber and forming the fruit juice-sugar mixture into desired shapes of hard candy.

In another preferred embodiment, the present invention is directed to a hard candy containing from about 0.1% to about 10% of an acidulant, by weight, prepared by a method which comprises the steps of:

(a) providing a vacuum cooker having a cooker coil, an atmospheric chamber, and a vacuum chamber;

(b) forming a sugar syrup having a moisture content from about 0.1% to about 5%, by weight;

(c) heating the sugar syrup in the cooker coil to cook the syrup;

(d) passing the cooked sugar syrup from the cooker coil to the atmospheric chamber;

(e) admixing the acidulant with the cooked sugar syrup in the atmospheric chamber to form an acidulant-sugar syrup mixture;

(f) passing the acidulant-sugar syrup mixture from the atmospheric chamber to the vacuum chamber to remove excess water; and (g) removing the acidulant-sugar syrup mixture from the vacuum chamber and forming the acidulant-sugar mixture into desired shapes of hard candy.

In yet another preferred embodiment, the present invention is directed to a hard candy containing from about 0.1% to about 5% of a thermolabile component, by weight, prepared by a method which comprises the steps of:

(a) providing a vacuum cooker having a cooker coil, an atmospheric chamber, and a vacuum chamber;

(b) forming a sugar syrup having a moisture content from about 0.1% to about 5%, by weight;

(c) heating the sugar syrup in the cooker coil to cook the syrup;

(d) passing the cooked sugar syrup from the cooker coil to the atmospheric chamber;

(e) admixing the thermolabile component with the cooked sugar syrup in the atmospheric chamber to form a thermolabile component-sugar syrup mixture;

(f) passing the thermolabile component-sugar syrup mixture from the atmospheric chamber to the vacuum chamber to remove excess water; and (g) removing the thermolabile component-sugar syrup mixture from the vacuum chamber and forming the thermolabile component-sugar mixture into desired shapes of hard candy.

In still yet another preferred embodiment, the present invention is directed to a hard candy comprising in percentages by weight a sugar syrup having a moisture content from about 0.1% to about 5% and cranberry juice present in an amount from about 1% to about 35%.

The present invention is further illustrated by the following examples which are not intended to limit the effective scope of the claims. All parts and percentages in the examples and throughout the specification and claims are by weight of the final composition unless otherwise specified.

EXAMPLE 1

This example demonstrates the improved method of the present invention for preparing a hard candy containing cranberry juice and raspberry juice.

Automatic and Continuous Cooker

FIG. 1 is an illustration of an automatic and continuous vacuum cooker having a cooker coil 10, an atmospheric chamber 20, and a vacuum chamber 30 for preparing hard candy containing fruit juice according to the method of the present invention. In FIG. 1, sugar syrup is passed to cooker coil 10 in the vacuum cooker to heat the sugar syrup into a candy. The cooked sugar syrup is then withdrawn from cooker coil 10 and passed to atmospheric chamber 20. Fruit juice from holding tank 40 is passed through calibrated metering pump 41 to injector 42 for admixture with the cooked sugar syrup in atmospheric chamber 20 to form a fruit juice-sugar syrup mixture. The fruit juice-sugar syrup mixture is then withdrawn from atmospheric chamber 20 and passed to vacuum chamber 30 to remove excess water from the fruit juice-sugar syrup mixture. The fruit juice-sugar syrup mixture is then withdrawn from vacuum chamber 30 and passed to receiving pan 50 to form the fruit juice-sugar mixture into desired candy shapes.

In FIG. 1, a discharge valve 21 separates atmospheric chamber 20 from vacuum chamber 30. Valve 21 is connected with a rod (not shown) to a piston (not shown). The space above the piston is connected to the vacuum chamber so that when this space is under vacuum, the piston is drawn upwards and opens discharge valve 21. When the vacuum in the space above the piston is broken (such as to permit the exchange of pans), valve 21 drops and closes atmospheric chamber 20 from the vacuum chamber 30.

A hard candy containing cranberry juice and raspberry juice was prepared according to the method set out above.

COOKED CANDY BASE

| INGREDIENT | PERCENT BY WEIGHT |
|---|---|
| LIQUID SUCROSE | 62.53 |
| CORN SYRUP | 34.47 |
| RESIDUAL MOISTURE | 3.00 |
| TOTAL | 100.00 |

CRANBERRY AND RASPBERRY HARD CANDY

| INGREDIENTS | PERCENT BY WEIGHT |
|---|---|
| COOKED CANDY BASE | 91.83 |
| CRANBERRY CONCENTRATE (PH 2.8) | 1.69 |
| RASPBERRY FLAVOR | 0.05 |
| RASPBERRY CONCENTRATE | 0.73 |
| CITRIC ACID | 2.00 |
| TANNIC ACID | 0.01 |
| GROUND SALVAGE | 0.97 |
| RESIDUAL MOISTURE | 2.72 |
| TOTAL | 100.00 |

EXAMPLE 2

This example demonstrates the improved method of the present invention for preparing a hard candy containing cranberry juice and grape juice.

A hard candy containing cranberry juice and grape juice was prepared according to the method set out in Example 1.

COOKED CANDY BASE

| INGREDIENT | PERCENT BY WEIGHT |
|---|---|
| LIQUID SUCROSE | 62.53 |
| CORN SYRUP | 34.47 |
| RESIDUAL MOISTURE | 3.00 |
| TOTAL | 100.00 |

CRANBERRY AND GRAPE HARD CANDY

| INGREDIENTS | PERCENT BY WEIGHT |
|---|---|
| COOKED CANDY BASE | 91.29 |
| CRANBERRY CONCENTRATE (PH 2.8) | 1.74 |
| GRAPE FLAVOR | 0.12 |
| GRAPE CONCENTRATE | 0.69 |
| CITRIC ACID | 2.00 |
| TANNIC ACID | 0.01 |
| PURPLE COLOR | 0.50 |
| GROUND SALVAGE | 0.98 |

CRANBERRY AND GRAPE HARD CANDY -continued

| INGREDIENTS | PERCENT BY WEIGHT |
|---|---|
| RESIDUAL MOISTURE | 2.68 |
| TOTAL | 100.00 |

EXAMPLE 3

This example demonstrates the improved method of the present invention for preparing a hard candy containing cranberry juice and strawberry juice.

A hard candy containing cranberry juice and raspberry juice was prepared according to the method set out in Example 1.

COOKED CANDY BASE

| INGREDIENT | PERCENT BY WEIGHT |
|---|---|
| LIQUID SUCROSE | 62.53 |
| CORN SYRUP | 34.47 |
| RESIDUAL MOISTURE | 3.00 |
| TOTAL | 100.00 |

CRANBERRY AND STRAWBERRY HARD CANDY

| INGREDIENTS | PERCENT BY WEIGHT |
|---|---|
| COOKED CANDY BASE | 92.18 |
| CRANBERRY CONCENTRATE (PH 2.8) | 2.34 |
| STRAWBERRY FLAVOR | 0.20 |
| STRAWBERRY CONCENTRATE | 0.06 |
| CITRIC ACID | 1.49 |
| TANNIC ACID | 0.01 |
| GROUND SALVAGE | 0.97 |
| RESIDUAL MOISTURE | 2.75 |
| TOTAL | 100.00 |

EXAMPLE 4

This example demonstrates the improved method of the present invention for preparing a hard candy containing pectin on a 0.2% dry basis.

A hard candy containing pectin was prepared according to the method set out in Example 1.

COOKED CANDY BASE

| INGREDIENT | PERCENT BY WEIGHT |
|---|---|
| LIQUID SUCROSE | 53.625 |
| CORN SYRUP | 43.875 |
| RESIDUAL MOISTURE | 2.500 |
| PORTION TOTAL | 95.4558 |

PECTIN SOLUTION

| INGREDIENT | PERCENT BY WEIGHT |
|---|---|
| PECTIN | 5.000 |

-continued

PECTIN SOLUTION

| INGREDIENT | PERCENT BY WEIGHT |
|---|---|
| PORTION TOTAL | 5.000 |

FRUIT JUICE CONCENTRATE

| INGREDIENT | PERCENT BY WEIGHT |
|---|---|
| RED FRUIT JUICE CONC. (ELDERBERRY) | 0.1500 |
| PORTION TOTAL | 0.1500 |

FLAVOR PREMIX

| INGREDIENTS | PERCENT BY WEIGHT |
|---|---|
| MENTHOL | 1.5747 |
| CRANBERRY CONCENTRATE (PH 2.8) | 1.74 |
| CHERRY FLAVOR | 5.3683 |
| CHERRY FLAVOR | 1.7894 |
| VANILLA FLAVOR | 1.7894 |
| HERBAL OIL BLEND | 0.0072 |
| GROUND SALVAGE | 71.5768 |
| CITRIC ACID | 17.8942 |
| PORTION TOTAL | 2.7942 |

FRUIT JUICE PREMIX

| INGREDIENT | PERCENT BY WEIGHT |
|---|---|
| CHERRY CRYSTALS | 79.0000 |
| PINEAPPLE CRYSTALS | 21.0000 |
| PORTION TOTAL | 1.4000 |

The invention being thus described, it will be obvious that the same may be varied in many ways. Such variations are not to be regarded as a departure from the spirit and scope of the invention and all such modifications are intended to be included within the scope of the following claims.

We claim:

1. A method for preparing a hard candy containing from about 1% to about 35% fruit juice, by weight, which comprises the steps of:

(a) providing a vacuum cooker having a cooker coil, an atmospheric chamber, and a vacuum chamber;

(b) forming a sugar syrup having a moisture content from about 0.1% to about 5%, by weight;

(c) heating the sugar syrup in the cooker coil to cook the syrup;

(d) passing the cooked sugar syrup from the cooker coil to the atmospheric chamber;

(e) admixing fruit juice with the cooked sugar syrup in the atmospheric chamber to form a fruit juice-sugar syrup mixture;

(f) passing the fruit juice-sugar syrup mixture from the atmospheric chamber to the vacuum chamber to remove excess water; and (g) removing the fruit juice-sugar syrup mixture from the vacuum chamber and forming the fruit juice-sugar mixture into desired shapes of hard candy.

2. The method according to claim 1, wherein the hard candy contains from about 9% to about 31% fruit juice.

3. The method according to claim 1, wherein the fruit juice has a solids content from about 15% to about 80% fruit juice.

4. The method according to claim 1, wherein the fruit juice is selected from the group consisting of raspberry, strawberry, grape, grapefruit, cherry, orange, apple, banana, pineapple, pear, and cranberry juice.

5. The method according to claim 1, wherein the fruit juice is cranberry juice.

6. The method according to claim 1, wherein the sugar syrup has a moisture content from about 0.1% to about 4%, by weight.

* * * * *